Feb. 11, 1958 R. C. FLETCHER 2,823,332

MICROWAVE AMPLIFIER DEVICE

Filed June 8, 1951 2 Sheets-Sheet 1

INVENTOR
R. C. FLETCHER
BY Hugh S. Wertz
ATTORNEY

MICROWAVE AMPLIFIER DEVICE

Filed June 8, 1951 2 Sheets-Sheet 2

INVENTOR
R. C. FLETCHER
BY Hugh S. Wertz
ATTORNEY 2,823,332

MICROWAVE AMPLIFIER DEVICE

Robert C. Fletcher, Chatham, N. J., assignor to Bell Telephone Laboratories, Incorporated, New York, N. Y., a corporation of New York Application June 8, 1951, Serial No. 230,569

9 Claims. (Cl. 315—3.5)

This invention relates to space charge devices and more particularly to microwave amplifiers which utilize the interaction between an electron stream and an electromagnetic wave to secure gain of the electromagnetic wave.

It is the object of this invention to improve amplifiers of this type by increasing their power-handling capacities and ruggedness without significant sacrifice in gain and broad-band characteristics.

In such amplifiers, an electric circuit propagates radio frequency electromagnetic waves therethrough at velocities slower than the velocity of light and an electron stream is projected through the electric field set up by the electric circuit and in the direction of wave propagation. By proper adjustment of the velocities of the propagated wave and the electron stream, the wave and stream can be made to interact in a cumulative fashion whereby amplification of the wave is realized. In such devices it is important for high gain operation to utilize an electric circuit which has a high impedance to permit good coupling between the wave and the stream. Also for broad-band frequency operation, it is desirable that the coupling be substantially uniform over the frequency range contemplated. In both these respects, the helix type circuit is well adapted and consequently it has found wide use as an electric circuit where high gain and broad-band operation are the primary considerations. Unfortunately, the required dimensions of such helix circuits are directly related to the wavelengths in the operating range intended, so that at very high frequencies, very fine and delicate helices become necessary. Such helices are difficult both to construct and to assemble in the tube. Additionally, helices in general have limited power dissipative characteristics and hence do not lend themselves to high-level power operation. As a result, it has become customary in devices for high frequency and/or high power operation to employ so-called filter type circuits for the wave propagating element. However, the various filter type circuits known hitherto have usually been characterized either by low impedances which result in inefficient coupling and low gain or by critically resonant elements which narrow the effective operating frequency range. As a consequence, these filter type circuits are generally not entirely suitable where high gain and broad-hand operation are important considerations.

Accordingly, it is another object of this invention to provide for a microwave amplifier a novel wave circuit structure which has a high impedance for high gain, is essentially without critically resonant elements for broad-band operation, has good heat dissipative properties for high power level operation, and is rugged for ease of construction and assembly.

To this end, the present invention utilizes a linear interdigital filter type circuit which comprises a main wave-guiding conducting structure having a linear array of conducting finger elements spaced apart along the longitudinal axis, alternate fingers extending laterally from opposite sides of the structure in an interdigital pattern, the whole array being supported opposite and integral with a conducting base plate. Interdigital filter circuits have been used hitherto as wave transmission circuits in devices of this general kind, but it appears that the full advantages of such a structure, made possible by construction and operation in accordance with the invention, have not been previously recognized. In particular, unless specific conditions, described hereinafter, are satisfied, broad-band operation is not achieved and hence the usefulness of the tube is severely lessened.

In the present invention, broad-band operation is realized by making the finger elements slightly less than a quarter wavelength of the mid-band of the desired operating frequency range, by spacing the finger elements to provide a phase difference in the electromagnetic wave between the free ends of adjacent fingers, and by spacing the interdigital circuit from the base plate by a distance which is related to the mean separation between the finger elements and, in general, is less than the mean separation between adjacent elements.

In practice, there are two important classes of devices known at present which utilize the interaction between an electron stream and a traveling electromagnetic wave to amplify the traveling wave: the conventional traveling wave amplifier wherein the additional energy for amplification is derived at the expense of the longitudinal average velocity of the electron stream, and the linear magnetron or magnetron amplifier which employs crossed electric and magnetic fields and wherein the additional energy for amplification is derived from the energy in the D.-C. transverse electric field. However, in each instance, it is important to provide a wave-guiding structure for the electromagnetic wave which should preferably have the various characteristics discussed. It is therefore, in accordance with the invention, to utilize the interdigital filter circuit of the kind described in both classes of devices.

The invention will be better understood from the following more detailed description taken in connection with the accompanying drawings in which.

Figure 1:
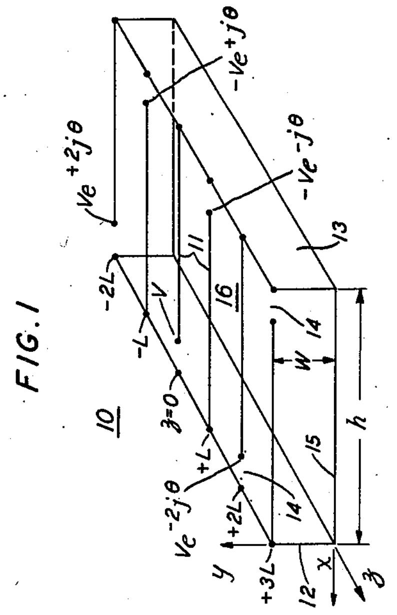
Fig. 1 is a schematic diagram of the interdigital circuit which is a feature of the present invention.

It will be convenient to a better understanding of the principles underlying the invention to analyze first in a rather general way the properties of an interdigital filter. In Fig. 1 there is shown schematically an interdigital filter circuit which will be described with reference to an orthogonal frame of reference, having *x*, *y* and *z* coordinates as shown.

The wave-guiding structure 10 which forms an exemplary embodiment of the linear interdigital filter consists essentially of two parallel conducting plates or side supports 12 and 13 (each in *yz* planes), connected to and integral with a conducting back or base plate 15 (in the *xz* plane). Extending alternately from the sides 12 and 13 and equidistantly spaced along the *z* axis are finger elements 11, here shown schematically as single wires, arranged in a linear array 16. Each element just falls short of the opposite side and, accordingly, gaps 14 are formed between the free end, of each element and the opposite side. In the analysis to follow, it will be convenient to designate by $h$, W, and L, along the $x$, $y$, and $z$ axes, respectively, the separation between the two sides 12 and 13, the spacing of closest approach between the linear array 16 and the base plate 15, and the mean separation between adjacent finger elements 11. The analysis is developed in a manner familiar to the filter art. There is first hypothesized the behavior to be expected. In the light of this expected behavior, a set of desired output characteristics are assumed. Thereafter, there are derived the specific relationships necessary to a realization of these characteristics in view of the behavior expected.

First, it can be expected that for the filter circuit to show propagating characteristics, there is a phase difference in the electromagnetic wave of $\theta$ radians between the free ends of adjacent elements, and that therefore the voltage across successive gaps will be as indicated in Fig. 1.

Figure 2A:
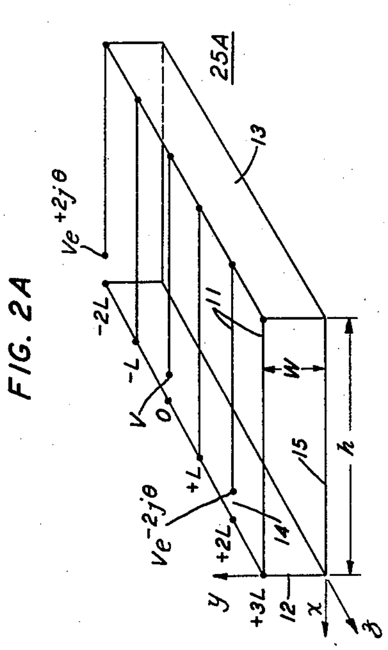
Figs. 2A and 2B are schematic diagrams of two circuits used for the synthesis of the circuit of Fig. 1 in the analysis of its operation.
Figure 2B:
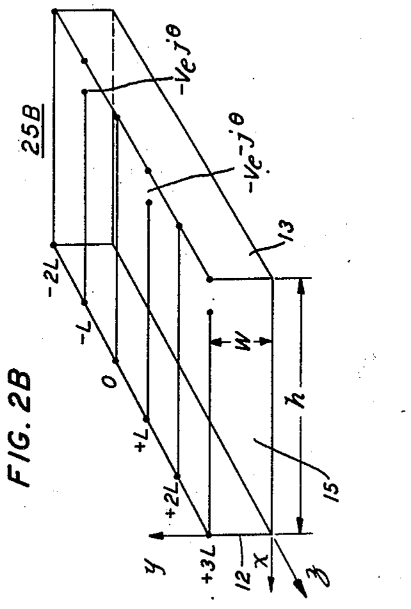

The principle of superposition permits the synthesis of the filter structure 10 by the combination of filters 20 and 25 shown in Figs. 2A and 2B, respectively. In the interest of convenience, the same reference characters are used throughout to denote corresponding elements. In the circuit of Fig. 2A, finger elements extending from the side 12 have been shorted to the opposite side 13 and a gap is formed only in the case of fingers extending from side 13 to the opposite side 12. In the circuit of Fig. 2B, the reverse is the case, and $\theta$ is given by the condition that the current across each gap in the circuit of Fig. 1 must be zero. An approximation of the operation can be had by considering only the interaction between adjacent finger elements. In this case, the interaction between adjacent fingers is given by the formula for parallel wire transmission lines. In addition if the base plate 15 is positioned close enough to the fingers (the distance W is small), the intervening fields are determined by the image of the finger elements, i. e., by another parallel wire transmission line whose separation is twice the distance to the back plate (a separation of 2W). Thus, the current in each gap as shown in Fig. 1 consists of the sum of three currents, one from each of the closed transmission line loops of the circuits 25A and 25B of Figs. 2A and 2B, respectively, and a third from the closed transmission line loop due to the image in the base plate. The field between elements is the useful field which will act on electrons when this structure is employed as a wave-propagating circuit and it is proportional to the voltage difference between elements. The voltage across a shorted transmission line a distance $s$ from the short is well known to be $$V(s)=V_0\frac{\sin 2\pi s/\lambda}{\sin 2\pi s_0/\lambda} \qquad (1)$$

where $V_0$ is the voltage at $s=s_0$, and $\lambda$ is the wavelength of the wave. Therefore, the voltage difference $\Delta V$ between two points at height $y$ located at $z=(m-1)L$ and at $z=mL$ (where $m$ is an integer) can be obtained by adding the voltages from the two sets of shorted transmission lines of length $s_0=h$ shown in Figs. 2A and 2B. After simplification, the following relationship is found to exist.

$$V=Ve^{-j\theta/2}\left(e^{-jm(\theta+\pi)}\cos\frac{\theta}{2}\frac{\cos \pi y/\lambda}{\cos \pi h/\lambda}+ je^{-jm\theta}\sin\frac{\theta}{2}\frac{\sin \pi y/\lambda}{\sin \pi h/\lambda}\right) \qquad (2)$$

It can be seen that the field between elements (proportional to $\Delta V$) is composed of two parts, one which has a phase difference of $\theta$ between elements and the other of which has a phase difference of $(\theta+\pi)$ between elements. The $(\theta+\pi)$ part has a maximum of $$\frac{\cos \theta/2}{\cos \pi h/\lambda}$$

in the middle of the elements and falls off to $\cos \theta/2$ on the ends. The $\theta$ part has a zero in the middle and rises to $\pm \sin \theta/2$ on the ends. For $$\theta<\frac{\pi}{2}$$

the $(\theta+\pi)$ component is more nearly constant and is always larger than the $\theta$ component and is thus more suited for use with electron interaction.

In devices which utilize the interaction between an electron stream and an electromagnetic wave, it is important for useful interaction that the phase velocity of the interacting wave remain very nearly the same as the direct-current velocity of the stream. Therefore a condition for broad-band operation of a suitable wave circuit is that the phase velocity of the interacting component of the circuit wave remain very nearly constant as the frequency of the input wave is varied. The phase velocity $v_p$ for the $(\theta+\pi)$ wave is given by $$v_p=f\lambda g=\frac{2\pi fL}{\theta+\pi} \qquad (3)$$

where $f$ is the frequency of the input wave, and $\lambda g$ is the wavelength of the $(\theta+\pi)$ wave. It can be seen that the condition for broad-band operation in this case is that $(\theta+\pi)$ be proportional to $f$.

The current flowing in a shorted transmission line a distance $s$ from the short is given by $$i=+\frac{V_0\cos 2\pi s/\lambda}{jK\cos 2\pi s_0/\lambda} \qquad (4)$$

where K is the impedance of the line and $V_0$ is the voltage at $s=s_0$. Therefore, the current $i$ in the finger at height $y$ and where $z=0$ can be obtained by adding the currents from the two sets of shorted transmission lines of length $s_0=h$ shown in Figs. 2A and 2B. After simplification, the following relationship is found.

$$i=\frac{V}{j}\frac{1}{\sin 2\pi h/\lambda}\left(\frac{2}{K_L}\cos\frac{\pi(h-y)}{\lambda}-\frac{e^{j\theta}}{K_L}\cos\frac{\pi(h+y)}{\lambda}-\frac{e^{-j\theta}}{K_L}\cos\frac{\pi(h+y)}{\lambda}-\frac{2}{K_W}\cos\frac{\pi(h-y)}{\lambda}\right) \qquad (5)$$

where $K_L$ and $K_W$ are the characteristic impedances of parallel wire transmission lines of separation L and 2W, respectively. Since the current across the gap must be zero, for $x=L/2$, $i$ must be zero. After substitution and simplification, it is found that $$\cos\theta=\left(1+\frac{K_L}{K_W}\right)\cos\frac{2\pi h}{\lambda} \qquad (6)$$

which determines $\theta$ as a function of frequency.

An examination of Equation 6 will show that for $2\pi h/\lambda=\pi/2$, $\theta$ is $\pi/2$, independent of the value of $$\frac{K_L}{K_W}$$

Thus, the frequency for which $\theta=\pi/2$ is determined only by the length of the finger elements, i. e., this frequency is that which makes the elements a quarter wavelength long. The rate of change of $\theta$ with frequency (about $\theta=\pi/2$) is governed by the value of $$\frac{K_L}{K_W}$$

For very small values of $$\frac{K_L}{K_W}$$

$\theta$ is substantially equal to $$\frac{2\pi h}{\lambda}$$

and so varies directly with frequency, while for larger values of $$\frac{K_L}{K_W}$$

$\theta$ increases more rapidly than does $2\pi h/\lambda$. Thus, the frequency for which $\theta=\pi/2$ is determined primarily by the length of the finger elements, while the rate of change of $\theta$ with frequency is determined primarily by the separation of the base plate relative to the separation between elements. As a result for a particular finger separation L, it is possible by adjusting the base plate distance W, to arrange a rate of change of $\theta$ about a particular frequency so that $$\frac{d\theta}{df}=\frac{\theta+\pi}{f}$$

which it can readily be seen from Equation 6 is the condition for broad-band operation. However, at frequencies other than that for which $\theta=\pi/2$, the above considerations must be modified slightly and although the frequency and rate of change of $\theta$ frequency are determined primarily by the length of the elements and the base plate spacing, there is some interdependence.

In particular by substituting in Equation 6, $$\Phi=\frac{2\pi h}{\lambda}$$

there will be obtained $$\cos\theta=\left(1+\frac{K_L}{K_W}\right)\cos\Phi \qquad (7)$$

Differentiating, there results $$\sin\theta\frac{d\theta}{d\Phi}=\left(1+\frac{K_L}{K_W}\right)\sin\Phi \qquad (8)$$

$$\frac{d\theta}{d\Phi}=\left(1+\frac{K_L}{K_W}\right)\frac{\sin\Phi}{\sin\theta} \qquad (9)$$

For broad-band operation $$\frac{d\theta}{d\Phi}\text{ equals }\frac{\theta+\pi}{\Phi}$$

Substituting $$\left(1+\frac{K_L}{K_W}\right)\frac{\sin\Phi}{\sin\theta}=\frac{\theta+\pi}{\Phi} \qquad (10)$$

For the simplest case where $\theta=\pi/2$, a solution of Equations 7 and 10 will be $$\frac{K_L}{K_W}=2 \qquad (11)$$

It can be seen that, in general to satisfy this last relationship, the spacing between adjacent elements will need to be larger than the spacing between the linear array and the base plate. However, it can be seen that in general the optimum positioning of the linear array with respect to the base plate is determined largely by the shape of the fingers and the particular phase difference $\theta$ at which the tube is operated. It can be expected that for conventional finger shapes the spacing between adjacent finger elements will be larger than the spacing between the linear array and base plate. It can be expected more generally that the mean separation between adjacent finger elements will be larger than the spacing between the linear array and base plate. It is to be noted that by "spacing" is intended the closest approach separation, while by "mean separation" is intended the center separation.

At this point, it will be convenient to outline the procedure to be used to construct an interdigital circuit in accordance with the principles indicated by the above analysis. Ordinarily, the first consideration is the operating frequency range and accelerating voltages desired. Since the phase velocity of the wave must be nearly equal to the average velocity of the electron stream for useful interaction, the phase velocity $v_p$ which should be provided by the filter is determined by the choice of electron accelerating voltages suitable in the particular case. Equation 3 relates the phase velocity $v_p$ with the finger separation L and the phase difference $\theta$ of the wave between ends of successive fingers. To fix the separation L, it will be necessary to choose a desired $\theta$. Equation 2 determines the field distribution of the desired component of the wave. With reference thereto, it can be seen that for small $\theta$, the desired $(\theta+\pi)$ component is largest and the undesired $\theta$ component smallest, while as $\theta$ increases towards $\pi$, the desired component vanishes leaving only the undesired component. This suggests using as small a $\theta$ as possible. Another factor in favor of small $\theta$ is that the $(\theta+\pi)$ component remains more nearly constant along the fingers as $\theta$ becomes small. However, these factors are to be balanced by the factor that when $\theta$ equals zero, there is a degeneracy in the phase velocities of the spatial harmonic components of the wave [which have a phase constant $(\theta+\pi m)$, $m$ being any integer]. This degeneracy tends to excite a backward traveling wave which may set up oscillations. Accordingly, one characteristic of the interdigital filter of the present invention is to provide a phase difference to the wave which is greater than zero between the free ends of successive fingers to prevent oscillations.

The above considerations suggest a compromise between higher gains for small $\theta$ and circuit stability at values of $\theta$ near to $\pi/2$. From Equation 3 it can be seen that, for values of $\theta$ between 0 and $\pi$, L should be chosen between $$\frac{v_p}{f}\text{ and }\frac{1}{2}\frac{v_p}{f}$$

where $v_p$ is approximately equal to the average velocity of the electron stream. In particular in a preferred embodiment, L is made equal to $$\frac{5v_p}{8f}$$

corresponding to $\theta=\pi/4$. In particular applications because of specific characteristics desired, it may be preferable to use smaller or larger values of $\theta$. After a particular value for $\theta$ is fixed, the separation L necessary therefor can be derived from Equation 3.

The next step in the construction is to choose an appropriate cross section for the finger elements. In the simplified analysis set forth above, line-like fingers have been assumed. In practice, the width in the $z$-direction can be decided on the basis of minimizing the excitation of the undesired spatial harmonic components of the wave as compared to the desired $(\theta+\pi)$ component. A detailed analysis of spatial harmonics for the case of flat fingers can be carried out to show that the circuit impedance as a function of finger thickness exhibits a rather broad maximum in the vicinity of a finger width equal to L/2. Accordingly in a preferred embodiment, there is utilized a finger width substantially equal to L/2.

The thickness and shape of the fingers in the $y$-direction entails another compromise. As this dimension is decreased, less energy is stored between the fingers resulting in an increase of circuit impedance and tube gain. In addition, since decreasing this thickness increases $K_L$, it can be seen from Equation 6 that decreasing the thickness permits a larger $K_W$ for the optimum broad-band condition. A large $K_W$ permits increasing the distance W and storing less energy in the tube. On the other hand, the fingers cannot be made too thin without too great sacrifice in mechanical strength and ruggedness. Accordingly, in a preferred embodiment there is chosen the strongest mechanical shape conducive to a large $K_L$.

At this point, it is possible to choose the distance $h$ and W. From Equation 6 it can be seen that for board-band operation when $\theta=\pi/2$, the distance $h$ which to a close approximation is the length of the finger elements, should be just a quarter wavelength of the input wave. This permits an evaluation of $h$ to a first approximation for other values of $\theta$ (such as $\theta=\pi/4$ as in the preferred embodiment) by a linear extrapolation from $\theta=\pi/2$ using the slope required for broad-band operation; thus approximately $$\frac{2\pi h}{\lambda}=\frac{1}{3}(\theta+\pi) \qquad (12)$$

and for $\theta=\pi/4$, the distance $h$ is approximately a fifth of a wavelength of the input wave.

This relationship can be utilized with Equations 7 and 10 to derive a value for $$\frac{K_L}{K_W}$$

Solving, it is found that $$\frac{K_L}{K_W}$$

is approximately 1.2.

It is to be noted at this point that $K_L$ and $K_W$ have been defined as the characteristic impedance of a pair of parallel transmission lines which are separated, respectively, by distances L and 2W. In the case of complicated finger shapes, the corresponding $K_L$'s and $K_W$'s will vary in various diverse ways with the dimensions pertinent.

The value of W can be obtained from Equation 6. In practice though, in view of the various approximations made in deriving Equation 6 and in other factors which limit the accuracy of any theoretical analysis of so complex a device, it may be advantageous to determine the base plate spacing by actual trial, appreciating from the analysis that the phase velocity can be affected by varying the spacing of the base plate and that there should be a reasonable base plate spacing which will make for broad-band operation. Similarly by actual trial there can also be made a final correction for determining the optimum length of the fingers for operation within a desired frequency range.

Figure 5:
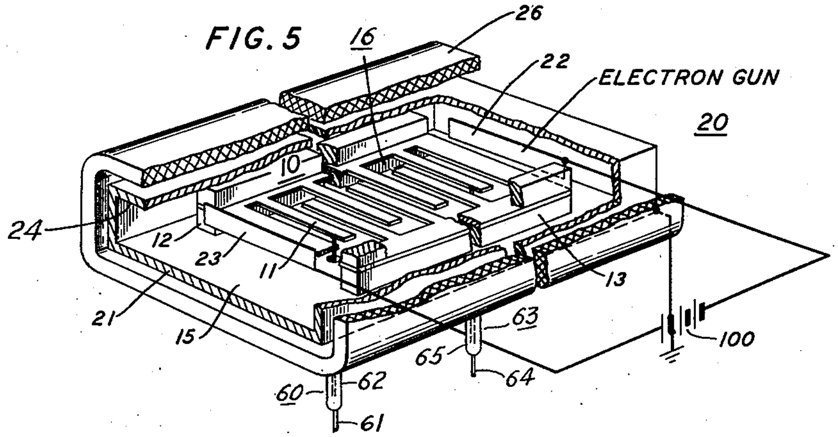
Figs. 5 and 6 show schematically two forms of traveling wave tubes incorporating an interdigital filter according to the invention.

In Fig. 5, there is shown schematically a microwave amplifier 20 of the traveling wave tube type in which there is incorporated a wave transmission circuit 10 in accordance with the invention. The various tube elements are enclosed in an evacuated envelope 21 which preferably is of a non-magnetic metal such as copper, which permits ruggedness of structure and yet avoids disturbance of the magnetic field customarily used for collimating the electron stream. In this regard, it is generally advantageous to minimize the use of magnetic materials throughout the tube. Housed at one end of the envelope and insulated therefrom is the electron gun 22 of conventional structure to provide an electron stream suitable for interaction with the electromagnetic field set up by the electric circuit. Such an electron gun customarily includes an electron emissive cathode surface, a heater unit, and various electrodes for collimating and accelerating the stream, none of which have been shown in detail here for the sake of simplicity. At the opposite end of the envelope, there is arranged a collector electrode 23 positioned in target relationship with the electron gun 22 for collecting the electrons after their travel through the region of interaction with the electric field. A return path for the electrons is provided between the collector electrode and the electron gun by way of a potential source 100 connected therebetween. Magnetic flux producing means 26 are utilized outside the envelope, for providing a longitudinal magnetic field between the electron gun and the collector to increase the straightness of electron flow. Intermediate the electron gun and the collector electrode, is positioned the interdigital wave transmission circuit 10, disposed to propagate a slow electromagnetic wave in the direction of electron flow. To realize optimum efficiency from this structure, the electron stream should flow across the entire length of the finger elements both above and below the linear array of elements. In accordance with the invention this circuit is an interdigital filter structure substantially of the kind shown schematically in Fig. 1 and described with particularity with reference thereto. In this tube, the filter structure 10 includes the side plates or supports 12 and 13 which are fastened to and integral with the base of the envelope which serves as the base plate 15. Alternately fastened to supports 12 and 13 are the finger elements 11 arranged in a linear array 16 equally spaced along the direction of electron flow. In accordance with one characteristic of this filter structure, this spacing is arranged to provide a desired phase difference in the traveling wave between the free ends of successive elements in accordance with Equation 3. In a preferred embodiment, this phase difference is chosen to be approximately $\pi/4$. Also in accordance with another characteristic of the invention, the length of each of the elements is chosen to be in accordance with Equation 12. For the case where the phase difference is made $\pi/4$, the length of each element is made slightly less than one quarter of the wavelength of the mid-frequency $fm$ of the desired operating frequency band. The cross section of each finger element is designed to accord with the conditions set forth hereinabove for optimum operation. In the preferred embodiment, there are utilized thin flat finger elements having a width (the direction of electron flow) which is approximately one half the means separation between fingers. As has been mentioned above, although Equation 6 can be referred to as a guide to the optimum separation between the linear array of elements 11 and the base plate 15, for optimum operation it is sometimes preferable to adjust this critical distance more precisely by actual trial. Additionally, in this embodiment the side plates 12 and 13 are extended and are integral with the top surface 24 of the tube envelope, which top surface is brought sufficiently close to the array of finger elements to serve as an additional base plate to minimize the leakage of radio frequency energy. In this case, since both the bottom and top surfaces act effectively as base plates, in arriving at the separation most suited for broad-band operation, the influence of each must be considered. However, the principles applicable are the same as for the case previously analyzed, so that it can be expected that the linear array will be equidistant from the top and bottom surfaces.

The tube is operated in the manner known for traveling wave tube operation. An input electromagnetic wave is applied by suitable means to the end of the wave circuit nearest the electron gun and is thereafter propagated along the circuit towards its opposite end. The electron gun is energized to provide an electron stream flowing contiguous to the linear array of elements 16 and hence through the electric field surrounding the wave circuit. Transverse motion of electrons is minimized by the strong longitudinal magnetic field. To provide acceleration to the electron stream, the electron source is operated at a potential negative with respect to the tube envelope and the wave circuit. This potential is chosen to impart a velocity to the electron stream substantially the same as the longitudinal wave propagation velocity so that cumulative interaction can be secured between the electron stream and the traveling electromagnetic wave. At the far end of the wave circuit, the amplified wave is derived by suitable output means for utilization.

Any of the many signal coupling means known in the art may be utilized for coupling electromagnetic wave energy to the wave circuit. In the specific embodiment depicted in Fig. 5 the signal input is applied by a coaxial line 63 having an outer conductor 65 connected to the base plate 15 and an inner conductor 64 connected to one finger 11 of the linear array 16. Similarly, the output is obtained from a coaxial line 60 having an inner conductor 61 connected to a finger 11 and an outer conductor 62 connected to the base plate 15. It is apparent that in such an arrangement the impedances of the transmission circuit 10 and the coaxial lines 60 and 63 should be matched by appropriate choice of dimensions or by impedance transformation, as is known in the art. Similarly, any of the fingers 11 may be employed for connection to the inner lines of the coupling circuits.

Figure 3:
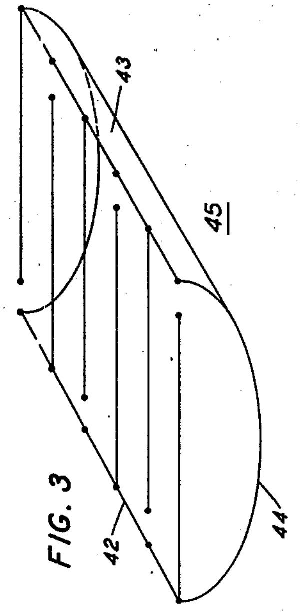
Fig. 3 is a schematic diagram of an alternative form of the interdigital filter which is a feature of the present invention.

Additionally, at this point it can be appreciated that modifications are possible in the structure of the interdigital filter which features the present invention. By way of illustration, in Fig. 3 there is shown an alternative embodiment of the wave circuit in which the sides 42 and 43 and central zone 44 merge to form a smooth curved plate 45. Such an embodiment is particularly adaptable for incorporation into a tube which utilizes a circularly cylindrical envelope. In other respects, the design and operation would be the same as for the embodiment hereinabove described. Accordingly, in the remainder of the specification and in the appended claims, a structure described as comprising side plates or supports and a base plate shall be construed to include a curved plate, such as shown here in which the two side portions 42 and 43 are the supports and the central zone 44 the base plate.

Furthermore, it is consonant with the spirit of the invention that the finger elements need not extend exactly straight. In some cases, it may be preferable to include some curvature in the finger elements to improve interaction between the propagated wave and the electron stream. In particular, in my Patent 2,768,322, issued October 23, 1956, there is described and claimed an interdigital filter in which finger elements are curved in a manner that will facilitate interaction with a cylindrical electron stream. However the considerations herein described for broad-band operation are applicable to such structures and it is to be understood that it is not intended to limit the claims herein appended to filter circuits which utilize straight fingers.

Figure 4:
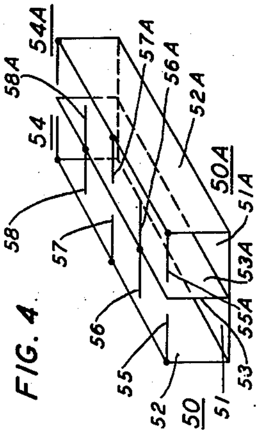
Fig. 4 shows schematically a parallel arrangement of two interdigital filters.

Fig. 4 shows an arrangement in which two identical interdigital filters are connected in parallel. Filter 50 comprises a conducting base plate 51, two conducting supports 52 and 53, and a linear array 54 of finger elements in an interdigital pattern. The filter 50A similarly comprises a conducting base plate 51A, two conducting supports 52A and 53A and a linear array 54A of finger elements in an interdigital pattern. To effect the parallel relationship, the support 53 of filter 50 is made integral with the support 53A of the filter 50A so that the two filters form mirror images of one another. Because of the separating support 53, 53A the two circuits will operate independently, except for some slight leakage fields, and each will have the characteristics previously described for a single interdigital structure. If the two circuits are operated in identical fashion to have the same phase constant $\theta$, and the voltages impressed initially on two corresponding fingers, such as 55 and 55A are the same, then according to the analysis developed above, the voltages will be the same on the free ends of corresponding fingers throughout the filter. Therefore it should be possible to connect the corresponding free ends, such as 56, 56A; 57; 57A; 58; 58A etc. together without interfering with the operation of the circuit. The only effect of this interconnection is to disallow independent operation of the two circuits; they may now operate only in the same phase.

The analysis may similarly be extended to include still further parallel filters.

Figure 6:
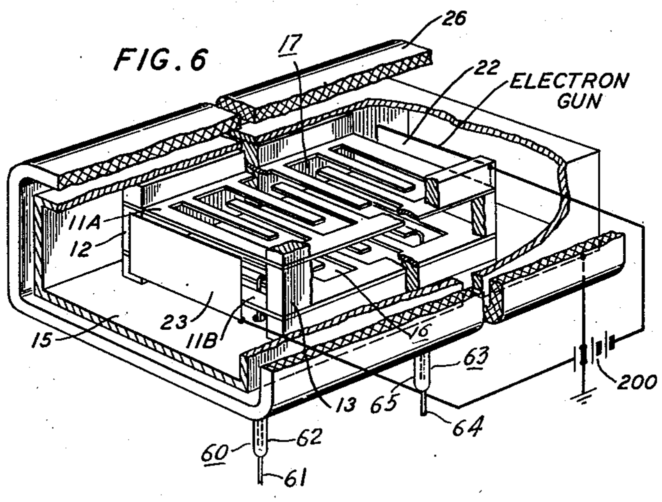

Fig. 6 shows schematically a traveling wave tube which, in order to secure still higher powers, utilizes two filter circuits of the kind which features the present invention. In this case, the tube shown in Fig. 5 is modified by the addition of a second parallel array 17 spaced apart from the original array 16 a distance which is approximately twice the spacing between the linear array 16 and its corresponding base plate 15 whose function is performed by the bottom surface of the tube envelope. It is then necessary to provide an electron stream which flows contiguous to each of the two arrays. In some cases, it may be preferable to utilize a second electron gun and collector electrode for this purpose, although in the embodiment here shown, a single gun and collector serves for both linear arrays. In other respects, the operation is the same. This principle can be extended for the incorporation of additional filter circuits in this way. As in the embodiment of Fig. 5, coupling to the linear arrays 16 and 17 may be attained by coaxial lines 60 and 63, only depicted for the linear array 16, similar coaxial line connections being provided to fingers 11A and to the adjacent base plate member.

Moreover, additional filter circuits may be incorporated by the use of a parallel arrangement of the kind described with reference to Fig. 4. It should be evident that there may be similarly utilized a wave guiding structure which represents a combination of the parallel arrangements described with reference to Figs. 4 and 6.

Figure 7:
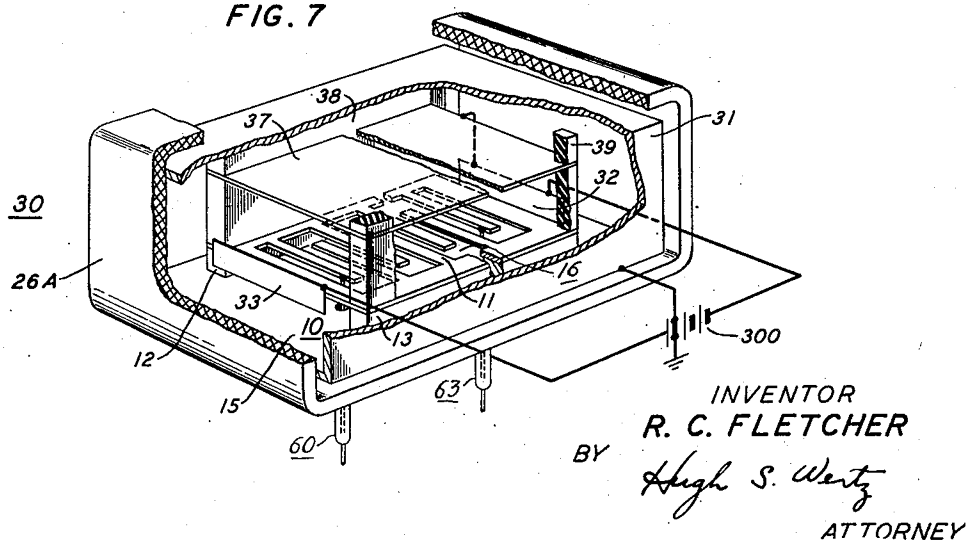
Fig. 7 shows schematically a magnetron amplifier which utilizes an interdigital filter in accordance with the invention.

In Fig. 7, there is shown schematically a magnetron amplifier 30 wherein is embodied a wave transmission circuit 10 in accordance with the invention. As before, the various tube elements are enclosed in an evacuated envelope 31 which preferably is of a non-magnetic metal. At one end of the envelope and insulated therefrom is the electron gun 32 of conventional structure to provide an electron stream suitable for magnetron amplifier operation. At the opposite end of the envelope is arranged the collector electrode 33 in target relationship with the gun. Intermediate the electron gun and the collector electrode is positioned the wave transmission circuit 10 comprising the linear array 16, the side plates 12 and 13 and the base plate 15 and disposed to propagate a slow electromagnetic wave along the direction of electron flow as in the case of the traveling wave amplifier. Intermediate the top surface of the envelope and opposed and parallel to the linear array 16 is positioned the conducting plate 37 which is maintained preferably at the potential of the electron source of the electron gun 22 and negative with respect to the wave circuit and tube envelope. In the embodiment shown, this conducting plate 37 is supported from the top surface of the tube envelope by the dielectric supports 38 and 39 which facilitate insulating the plate 37 from the tube envelope. In practice it is usually desirable to make the spacing between plate 37 and the array 16 greater than the spacing between the base plate 15 and the array 16 to minimize its interference with the operation of the filter circuit. Magnetic flux producing means 34 are utilized to provide a transverse magnetic field, which is normal to both the direct-current electric field between the conducting plate 37 and the linear array 16 and the longitudinal direction of wave propagation. The electrons are emitted from the electron gun to have an initial average velocity and direction as to make them travel in a straight line towards the collector 33 between the linear array 16 and conducting plate 37, the magnetic and electric forces just cancelling in the manner characteristic of magnetron amplifier operation. The average velocity of the electron stream is adjusted to be suitable for interaction with the traveling electromagnetic wave. In the construction of the wave circuit itself, the same considerations described with reference to the wave circuit for the traveling wave tube are here generally applicable with the exceptions that (1) because of the conducting plate 37 it is impractical to construct both the top and bottom surfaces of the tube envelope as base plates, (2) because of electronic considerations peculiar to the magnetron amplifier only one side of the circuit can conveniently be used for interaction with the electron stream; and (3) because the electromagnetic wave in the magnetron amplifier derives its additional energy from the transverse direct-current field, there is likely to be more electrons impinging on the circuit and hence it ought to be more ruggedly constructed than for conventional traveling wave tube operation in order to dissipate the additional power.

Obviously, additional modifications will occur to those skilled in the art and it is intended to include such modifications within the scope of the claims.

What is claimed is:

1. In a device which utilizes the interaction between an electron beam and a traveling electromagnetic wave, an electron source and a target electrode spaced apart for defining therebetween a path of electron flow; a wave transmission circuit positioned along said path of flow for propagating a traveling electromagnetic wave in coupling relation with said electron flow, said wave transmission circuit comprising a conductive base plate, two conductive supports spaced apart along their lengths and extending parallel to the path of electron flow, each support being conductively connected for high frequency current flow to said base plate, and a plurality of conductive elements spaced apart in an array parallel to the path of flow, adjacent elements of said array being conductively connected for high frequency current flow to an opposite one of said conductive supports and alternate elements being conductively connected for high frequency current flow to the same conductive support, said wave transmission circuit being characterized in that the spacing between the base plate and the array of elements along a major portion of the length of the elements is less than the mean separation between adjacent elements of the array; and signal coupling means in energy coupling relation with said wave transmission circuit.

2. In a device which utilizes the interaction between an electron beam and a traveling electromagnetic wave for operation over a predetermined frequency band, an electron source and a target electrode spaced apart for defining therebetween a path of electron flow, a wave transmission circuit positioned along said path of flow for propagating a traveling electromagnetic wave in coupling relation with said electron flow, said wave transmission circuit comprising a conductive base plate, two conductive supports spaced apart along their lengths and extending parallel to the path of electron flow, each support being conductively connected for high frequency current flow to said base plate, and a plurality of conductive elements spaced apart in a linear array, each element being substantially a quarter wavelength long at the midband frequency, adjacent elements of said array being conductively connected for high frequency current flow to an opposite one of said conductive supports and alternate elements being conductively connected for high frequency current flow to the same conductive support, said wave transmission circuit being characterized in that the spacing between the base plate and the linear array of elements along a major portion of the length of said elements is less than the mean separation between adjacent elements of the array and signal coupling means in energy coupling relation over the predetermined frequency band with said wave transmission circuit.

3. In a device which utilizes the interaction between an electron beam and a traveling electromagnetic wave for operation over a predetermined frequency band, an electron source and a target electrode spaced apart for defining therebetween a longitudinal path of electron flow, a wave transmission circuit positioned along said path of flow for propagating a traveling electromagnetic wave in coupling relation with said electron flow, said wave transmission circuit comprising a conductive base plate, two conductive supports spaced apart along their lengths approximately an integral number of quarter wavelengths at the midband operating frequency and extending parallel to the path of electron flow, each support being conductively connected for high frequency current flow to said base plate, adjacent elements of said array being conductively connected for high frequency current flow to an opposite one of said conductive supports and alternate elements being conductively connected for high frequency current flow to the same conductive support, said wave transmission circuit being characterized in that the spacing between the base plate and the linear array of elements along a major portion of the length of said elements is less than the mean separation between adjacent elements of the array, and signal coupling means in energy coupling relation with said wave transmission circuit over the predetermined frequency band.

4. In a device which utilizes the interaction between an electron beam and a traveling electromagnetic wave, an electron source and a target electrode spaced apart for defining therebetween a longitudinal path of electron flow, a wave transmission circuit positioned along said path of flow for propagating a traveling electromagnetic wave in coupling relation with said electron flow, said wave transmission circuit comprising a conductive base plate, two conductive supports spaced apart along their lengths and extending parallel to the path of electron flow, each support being conductively connected for high frequency current flow to said base plate, and a plurality of conductive elements spaced apart in a linear array, adjacent elements of said array being conductively connected for high frequency current flow to an opposite one of said conductive supports and alternate elements being conductively connected for high frequency current flow to the same conductive support, said wave transmission circuit being characterized in that the spacing between the base plate and the linear array of elements along a major portion of the length of said elements is less than the mean separation between adjacent elements of the array, signal input coupling means at one end of the circuit for supplying wave energy thereto, and output coupling means at the other end of said circuit for deriving wave energy therefrom.

5. In a device which utilizes the interaction between an electron beam and a traveling electromagnetic wave, for operation over a predetermined frequency band, an electron source and a target electrode spaced apart for defining therebetween a longitudinal path of electron flow, a wave transmission circuit positioned along said path of flow for propagating a traveling electromagnetic wave in coupling relation with said electron flow, said wave transmission circuit comprising a conductive base plate, two conductive supports spaced apart along their lengths and extending parallel to the path of electron flow, each support being conductively connected for high frequency current flow to said plate, and a plurality of conductive elements spaced apart in a linear array, each element being substantially a quarter wavelength long at the midband frequency, adjacent elements of said array being conductively connected for high frequency current flow to an opposite one of said conductive supports and alternate elements being conductively connected for high frequency current flow to the same conductive support, said wave transmission circuit being characterized in that the spacing between the base plate and the linear array of elements along a major portion of the length of said elements is less than the mean separation between adjacent elements of the array, signal input coupling means at one end of the circuit for supplying wave energy thereto, and signal output coupling means at the other end of said circuit for deriving wave energy therefrom.

6. In a device which utilizes the interaction between an electron beam and a traveling electromagnetic wave, an electron source and a target electrode spaced apart for defining therebetween a longitudinal path of electron flow, a wave transmission circuit positioned along said path of flow for propagating a traveling electromagnetic wave in coupling relation with said electron flow, said wave transmission circuit comprising a conductive base plate, two conductive supports spaced apart along their lengths and extending parallel to the path of electron flow, each support being conductively connected for high frequency current flow to said base plate, and a plurality of conductive elements spaced apart in a linear array, adjacent elements being separated in a direction of electron flow by a distance which is between $$\frac{v_p}{f_m} \text{ and } \frac{v_p}{2f_m}$$

where $v_p$ is the phase velocity of the traveling electromagnetic wave along the path of flow and $f_m$ is the midpoint of the frequency range of said wave and being conductively connected for high frequency current flow to an opposite one of said conductive supports and alternate elements being conductively connected for high frequency current flow to the same conductive support, said wave transmission circuit being characterized in that the spacing between the base plate and the linear array of elements along a major portion of the length of said elements is less than the mean saparation between adjacent elements of the array, and signal coupling means in energy coupling relation with said wave transmission circuit.

7. A device according to claim 6 in which the separation between adjacent elements in the linear array is equal to $$\frac{5v_p}{8f_m}$$

8. In a device which utilizes the interaction between an electron beam and a traveling electromagnetic wave, an electron source and a target electrode spaced apart for defining therebetween a longitudinal path of electron flow, a wave transmission circuit positioned along said path of flow for propagating a traveling electromagnetic wave in coupling relation with said electron flow, said wave transmission circuit comprising a conductive base plate, two conductive supports spaced apart along their lengths and extending parallel to the path of electron flow, each support being conductively connected for high frequency current flow to said base plate, and a plurality of conductive elements spaced apart in a linear array parallel to the base plate, each element having a dimension parallel to the direction of electron flow which is substantially greater than its dimension transverse to the direction of electron flow and perpendicular to the base plate, adjacent elements of said array being conductively connected for high frequency current flow to an opposite one of said conductive supports and alternate elements being conductively connected for high frequency current flow to the same conductive support, said wave transmission circuit being characterized in that the spacing between the base plate and the linear array of elements along the major portion of the length of said elements is less than the mean separation between adjacent elements of the array, and signal coupling means in energy coupling relation with said wave transmission circuit.

9. In a device which utilizes the interaction between an electron beam and a traveling electromagnetic wave for operation over a predetermined frequency band having a midband frequency $f$; an electron source and a target electrode spaced apart for defining therebetween a path of electron flow; a wave transmission circuit positioned along said path of flow for propagating a traveling electromagnetic wave in coupling relation with said electron flow, said wave transmission circuit comprising a conductive base plate, two conductive supports spaced apart along their lengths, and extending parallel to the path of electron flow, each support being conductively connected for high frequency current flow to said base plate, and a plurality of conductive elements spaced apart in an array parallel to the path of flow, adjacent elements of said array being conductively connected for high frequency current flow to an opposite one of said conductive supports and alternate elements being conductively connected for high frequency current flow to the same conductive support, said wave transmission circuit being characterized in that the spacing between the base plate and the array of elements is sufficiently small that $$\frac{df}{d\theta}$$

is substantially equal to $$\frac{\theta+\pi}{f}$$

where $\theta$ is the phase difference between adjacent elements; and signal coupling means in energy coupling relation with said wave transmission circuit.

References Cited in the file of this patent

UNITED STATES PATENTS

| | | |
|---|---|---|
| 2,367,295 | Llewellyn | Jan. 16, 1945 |
| 2,428,612 | Blewett | Oct. 7, 1947 |
| 2,508,280 | Ludi | May 16, 1950 |
| 2,531,972 | Doehler et al. | Nov. 28, 1950 |
| 2,532,545 | Everhart | Dec. 5, 1950 |
| 2,541,843 | Tiley | Feb. 13, 1951 |
| 2,566,087 | Lerbs | Aug. 28, 1951 |
| 2,687,777 | Warnecke et al. | Aug. 31, 1954 |